United States Patent [19]
Shoup

[11] Patent Number: 6,045,176
[45] Date of Patent: Apr. 4, 2000

[54] DETACHABLE SUN ROOF VENT ASSEMBLY

[76] Inventor: Chris M. Shoup, 1216 Pressage Ridge, Conyers, Ga. 30013

[21] Appl. No.: 09/286,510

[22] Filed: Apr. 6, 1999

[51] Int. Cl.⁷ .......................................................... B60J 7/11
[52] U.S. Cl. ............................................ 296/217; 454/219
[58] Field of Search ............................. 296/217; 454/129, 454/155, 158

[56] References Cited

U.S. PATENT DOCUMENTS

| | | | |
|---|---|---|---|
| 4,395,939 | 8/1983 | Hough et al. | 296/217 |
| 4,743,279 | 5/1988 | Kvist et al. | 454/158 |
| 4,750,782 | 6/1988 | Turner | 296/217 |
| 4,800,803 | 1/1989 | Farmont | 454/129 |
| 4,844,538 | 7/1989 | Ricks | 296/217 |
| 4,934,754 | 6/1990 | Cioffi | 296/217 |
| 5,031,959 | 7/1991 | Queveau | 296/223 |
| 5,248,278 | 9/1993 | Fuerst et al. | 296/217 |
| 5,253,829 | 10/1993 | Willey | 296/217 |
| 5,342,238 | 8/1994 | Segerpalm et al. | 454/158 |
| 5,344,361 | 9/1994 | Matthias | 454/129 |
| 5,660,429 | 8/1997 | Wienchol | 296/217 |

*Primary Examiner*—Gary C. Hoge
*Attorney, Agent, or Firm*—Joseph N. Breaux

[57] ABSTRACT

A vent assembly that is attached to the vehicle roof along the front edge of the sun roof opening that captures air and directs the air out through an air discharge opening. The air discharge opening is provided with an air flow direction deflector to allow the occupants of the vehicle to direct the airflow through the vent assembly to the desired areas within the passenger compartment of the vehicle. The vent assembly also includes a baffle assembly to allow the user to control the volume of air output from the air discharge opening.

1 Claim, 2 Drawing Sheets

DETACHABLE SUN ROOF VENT ASSEMBLY

TECHNICAL FIELD

The present invention relates to vehicle ventilation assemblies and more particularly to a detachable sun roof vent assembly that includes a vent housing body having an air intake opening and an air outlet opening in connection with each other; a bug screen structure covering the air intake opening; a vehicle roof attachment assembly in connection with the vent housing body including a roof edge receiving channel formed into the front of the vent housing body and securing clamps provided in connection with the vent housing body and positioned in a manner to grip and hold a section of a vehicle roof within the roof edge receiving channel; an air discharge direction deflector mounted in connection with the vent housing body and positionable to direct the air discharged from the air discharge opening of the vent housing body in user selected directions; and an air baffle assembly mounted between the air intake opening and the air discharge opening of the vent housing body and positionable by a user to control the flow of air between the air intake opening and the air discharge opening by sliding a baffle plate into and out of the vent housing body.

BACKGROUND ART

It is often desirable to have the sun roof of a vehicle open to provide an air feel to the vehicle as well as to provide some ventilation. Although the sun roof opening provides ventilation to the interior of the vehicle, the back seat occupants often receive too much air flow while the occupants of the front seats receive too little. It would be a benefit, therefore, to have a vent assembly that could be attached to the vehicle roof along the front edge of the sun roof opening that could capture air and direct the air out through an air discharge opening with an air flow direction deflector to allow the occupants of the vehicle to direct the airflow through the vent assembly to the desired areas within the passenger compartment of the vehicle.

GENERAL SUMMARY DISCUSSION OF INVENTION

It is thus an object of the invention to provide a detachable sun roof vent assembly that includes an air flow direction deflector to allow the occupants of the vehicle to direct the airflow through the vent assembly to the desired areas within the passenger compartment of the vehicle.

It is a further object of the invention to provide a detachable sun roof vent assembly that includes a vent housing body having an air intake opening and an air outlet opening in connection with each other; a bug screen structure covering the air intake opening; a vehicle roof attachment assembly in connection with the vent housing body including a roof edge receiving channel formed into the front of the vent housing body and securing clamps provided in connection with the vent housing body and positioned in a manner to grip and hold a section of a vehicle roof within the roof edge receiving channel; an air discharge direction deflector mounted in connection with the vent housing body and positionable to direct the air discharged from the air discharge opening of the vent housing body in user selected directions; and an air baffle assembly mounted between the air intake opening and the air discharge opening of the vent housing body and positionable by a user to control the flow of air between the air intake opening and the air discharge opening by sliding a baffle plate into and out of the vent housing body.

Accordingly, a detachable sun roof vent assembly is provided. The detachable sun roof vent assembly includes a vent housing body having an air intake opening and an air outlet opening in connection with each other; a bug screen structure covering the air intake opening; a vehicle roof attachment assembly in connection with the vent housing body including a roof edge receiving channel formed into the front of the vent housing body and securing clamps provided in connection with the vent housing body and positioned in a manner to grip and hold a section of a vehicle roof within the roof edge receiving channel; an air discharge direction deflector mounted in connection with the vent housing body and positionable to direct the air discharged from the air discharge opening of the vent housing body in user selected directions; and an air baffle assembly mounted between the air intake opening and the air discharge opening of the vent housing body and positionable by a user to control the flow of air between the air intake opening and the air discharge opening by sliding a baffle plate into and out of the vent housing body.

BRIEF DESCRIPTION OF DRAWING

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
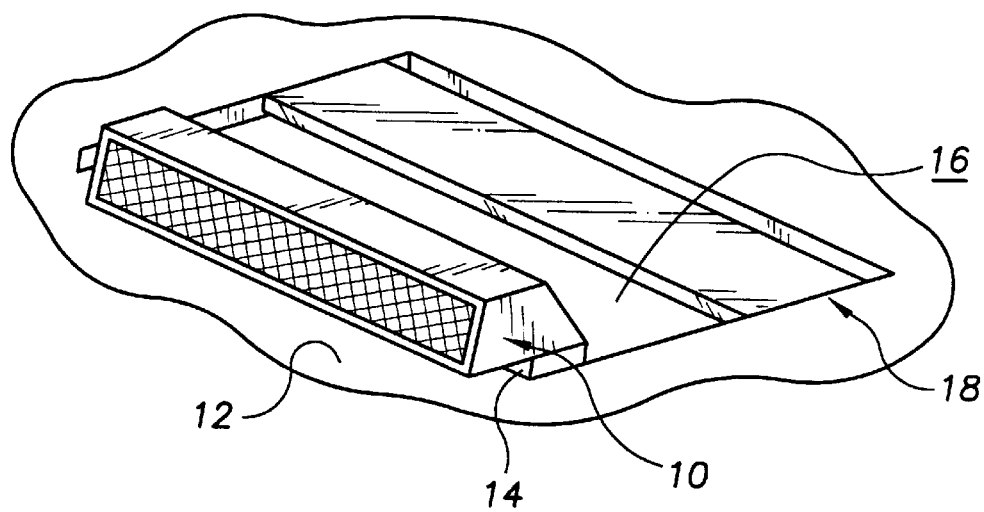
FIG. 1 is a perspective view showing an exemplary embodiment of the detachable sun roof vent assembly attached to the vehicle roof along the front edge of the sun roof opening of a representative vehicle sun roof mechanism.

FIG. 1 shows an exemplary embodiment of the detachable sun roof vent assembly of the present invention, generally designated 10, attached to the vehicle roof 12 along the front edge 14 of the sun roof opening 16 of a representative vehicle sun roof mechanism, generally designated 18.

Figure 2:
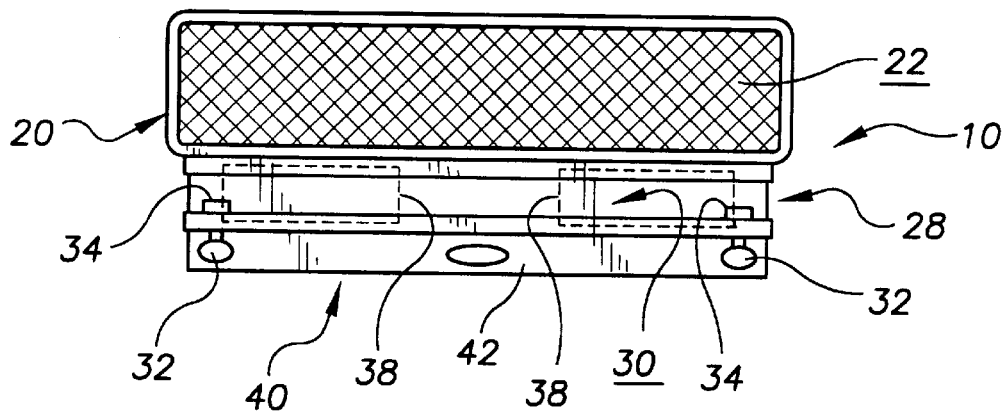
FIG. 2 is a front plan view of the exemplary detachable sun roof vent assembly of FIG. 1 in isolation showing the vent housing body having an air intake opening and an air outlet opening in connection with each other; a bug screen structure covering the air intake opening; a vehicle roof attachment assembly in connection with the vent housing body including a roof edge receiving channel formed into the front of the vent housing body and securing clamps provided in connection with the vent housing body and positioned in a manner to grip and hold a section of a vehicle roof within the roof edge receiving channel; an air discharge direction deflector mounted in connection with the vent housing body and positionable to direct the air discharged from the air discharge opening of the vent housing body in user selected directions; and an air baffle assembly mounted between the air intake opening and the air discharge opening of the vent housing body and positionable by a user to control the flow of air between the air intake opening and the air discharge opening by sliding a baffle plate into and out of the vent housing body.

With reference to FIG. 2, detachable sun roof vent assembly 10 includes a molded plastic vent housing body, generally designated 20, having an air intake opening 22 (see also FIGS. 3 and 4) and an air outlet opening 24 (see FIGS. 3 and 4) in connection with each other; a plastic mesh bug screen structure 26 covering air intake opening 22; a vehicle roof attachment assembly, generally designated 28 in connection with vent housing body 20 including a roof edge receiving channel 30 formed into the front of vent housing body 20 and two thumb screw securing clamps 32 provided in connection with vent housing body 20 such that compression plates 34 provided on the end of each securing clamp 32 are positioned within the roof edge receiving channel 30; two air discharge direction deflectors 38 (shown in dashed lines and in FIGS. 3 and 4) mounted in connection with vent housing body 20 and positionable to direct the air discharged from air discharge opening 24 (FIGS. 3 and 4); and an air baffle assembly, generally designated 40 including a slidable baffle plate 42.

Figure 3:
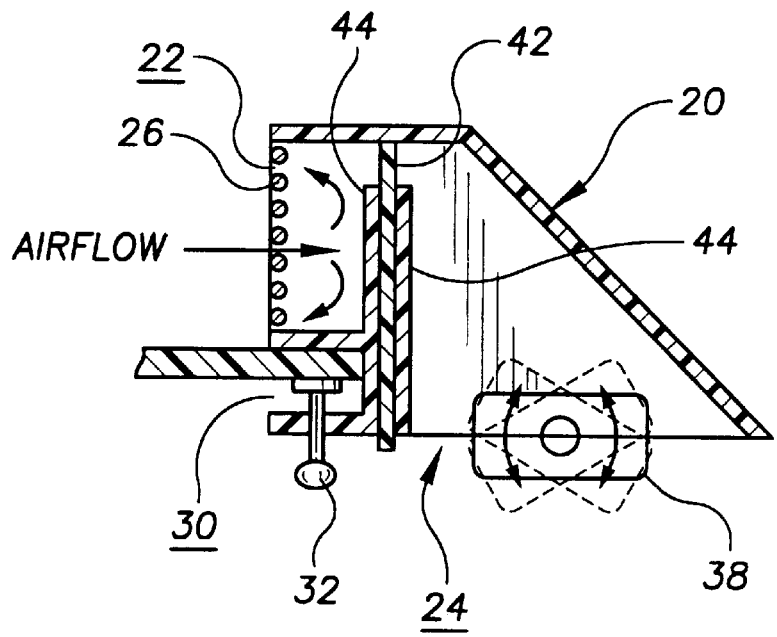
FIG. 3 is a cross sectional view through the detachable sun roof vent assembly of FIG. 1 showing the vent housing body including the air intake opening and the air outlet opening in connection with each other; the bug screen structure covering the air intake opening; the vehicle roof attachment assembly a representative section of the vehicle roof held within the roof edge receiving channel by the securing clamps; one of the two identical air discharge direction deflectors mounted in the air discharge opening of the vent housing body; and the air baffle assembly with the sliding baffle plate completely positioned into the vent housing body completely blocking air flow between the air intake opening and the air discharge opening.
Figure 4:
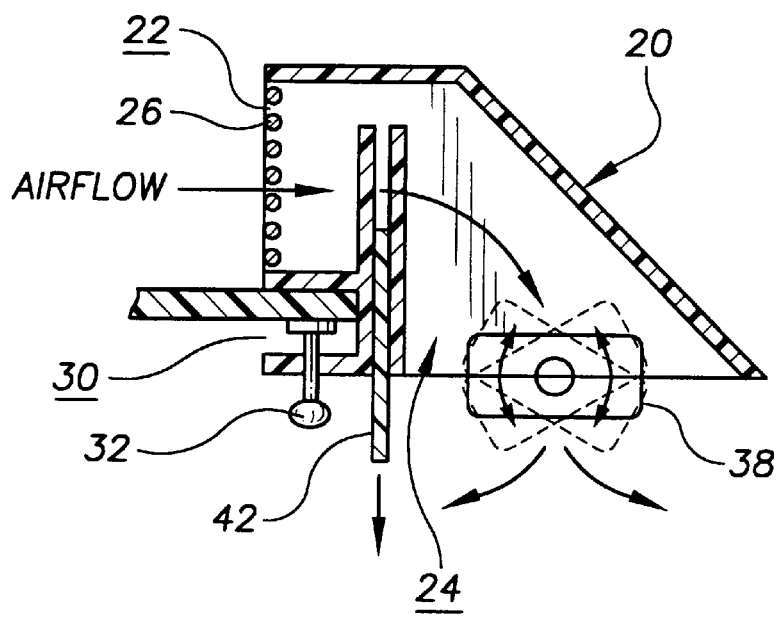
FIG. 4 is a cross sectional view showing the detachable sun roof vent assembly with the sliding baffle plate of the air baffle assembly partially withdrawn from the vent housing body allowing restricted air flow between the air intake opening and the air discharge opening.

With reference to FIG. 3, baffle plate 42 is guided by two sets of plate guides 44 and is slidable completely into vent housing body 20 between air intake opening 22 and air discharge opening 24 to completely block the flow of air therebetween. Referring now to FIG. 4, when some air flow is desired, baffle plate 42 is withdrawn from vent housing body 20 until the desired air flow volume is achieved. The direction of the air flow is selected by orienting the two air discharge direction deflectors 38 until the desired air flow directions is achieved.

It can be seen from the preceding description that a detachable sun roof vent assembly has been provided that includes an air flow direction deflector to allow the occupants of the vehicle to direct the airflow through the vent assembly to the desired areas within the passenger compartment of the vehicle; and that includes a vent housing body having an air intake opening and an air outlet opening in connection with each other; a bug screen structure covering the air intake opening; a vehicle roof attachment assembly in connection with the vent housing body including a roof edge receiving channel formed into the front of the vent housing body and securing clamps provided in connection with the vent housing body and positioned in a manner to grip and hold a section of a vehicle roof within the roof edge receiving channel; an air discharge direction deflector mounted in connection with the vent housing body and positionable to direct the air discharged from the air discharge opening of the vent housing body in user selected directions; and an air baffle assembly mounted between the air intake opening and the air discharge opening of the vent housing body and positionable by a user to control the flow of air between the air intake opening and the air discharge opening by sliding a baffle plate into and out of the vent housing body.

It is noted that the embodiment of the detachable sun roof vent assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A detachable sun roof vent assembly comprising:

a vent housing body having an air intake opening and an air outlet opening in connection with each other;

a bug screen structure covering said air intake opening;

a vehicle roof attachment assembly in connection with said vent housing body including a roof edge receiving channel formed into said front of said vent housing body and securing clamps provided in connection with said vent housing body and positioned in a manner to grip and hold a section of a vehicle roof within said roof edge receiving channel;

an air discharge direction deflector mounted in connection with said vent housing body and positionable to direct said air discharged from said air discharge opening of said vent housing body in user selected directions; and an air baffle assembly mounted between said air intake opening and said air discharge opening of said vent housing body and positionable by a user to control said flow of air between said air intake opening and said air discharge opening by sliding a baffle plate into and out of said vent housing body.

* * * * *